(12) United States Patent
Yim (10) Patent No.: US 8,576,917 B2
(45) Date of Patent: Nov. 5, 2013

(54) IMAGE PROCESSING METHOD TO REDUCE COMPRESSION NOISE AND APPARATUS USING THE SAME

(75) Inventor: Dale Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 805 days.

(21) Appl. No.: 12/730,020

(22) Filed: Mar. 23, 2010

(65) Prior Publication Data

US 2011/0007820 A1 Jan. 13, 2011

(30) Foreign Application Priority Data

Jul. 9, 2009 (KR) ........................ 10-2009-0062622

(51) Int. Cl.
*H04N 7/12* (2006.01)
(52) U.S. Cl.
USPC ............ 375/240.24; 375/240.26; 375/E07.2; 375/240.12; 382/232; 382/236
(58) Field of Classification Search
USPC .......... 382/268, 232, 248, 250; 348/441, 625, 348/627; 375/240.27, E7.135, E7.148, 375/E7.17, E7.176, E7.187, E7.193, 375/E7.198, E7.22, 240.26, 240.24, 240.03, 375/240.12, E07.26
See application file for complete search history.

(56) References Cited

U.S. PATENT DOCUMENTS

| 7,042,519 | B2 * | 5/2006 | Lim | 348/627 |
| 7,688,385 | B2 * | 3/2010 | Muto | 348/441 |
| 8,045,821 | B2 * | 10/2011 | Tasaka et al. | 382/268 |
| 2002/0168011 | A1 * | 11/2002 | Bourge | 375/240.27 |
| 2003/0090594 | A1 * | 5/2003 | Lim | 348/625 |
| 2005/0265623 | A1 * | 12/2005 | Estevez et al. | 382/268 |
| 2008/0199090 | A1 * | 8/2008 | Tasaka et al. | 382/233 |
| 2009/0219438 | A1 * | 9/2009 | Muto | 348/441 |

FOREIGN PATENT DOCUMENTS

WO 2005/086491 A1 9/2005

OTHER PUBLICATIONS

Peterson, H.A. et al., "Quantization of color image components in the DCT domain", Proceedings of the International Society for Optical Engineering, SPIE, vol. 1453, Feb. 24, 1991, p. 210-222.
Du, Yonggang, "Scene Adaptive Vector Quantization", Jan. 1, 1989, p. 571-575.
Haskell, B. G. et al., "Digital Video: An introduction to MPEG2", Digital Video: an Introduction to MPEG-2, Digital Multimedia Standards Series, Jan. 1, 1997, p. 162-169, 173-175.
Pigeon, et al., "Advantages and Drawbacks of Interlaced and Progressive Scanning Formats", 1996, p. 1-28 http://www.stephanepigeon.com/Docs/delivl.pdf.
Puri, Atul et al., "Video coding using the H.264/MPEG-4 AVC compression standard", Signal Processing: Image Communication, vol. 19, No. 9, Oct. 1, 2004, p. 793-849.
Ren, J. et al., Algorithmic Optimization for H.264 Deblocking Filter on Portable Devices, IEEE International Symposium on Consumer Electronics, Jun. 1, 2007, p. 1-6.
Communication from the European Patent Office issued Sep. 21, 2010, in counterpart European Application No. 10158551.1.

* cited by examiner

*Primary Examiner* — Mekonen Bekele
(74) *Attorney, Agent, or Firm* — Sughrue Mion, PLLC (57) ABSTRACT

An image processing method which adaptively reduces compression noise of a digital image and an image processing apparatus using the same are provided. The image processing method determines weight to reduce compression noise of an image based on local information and frame information, and processes the image according to the weight. Therefore, noise is adaptively reduced according to an image, and also noise is reduced with the optimal extent.

22 Claims, 8 Drawing Sheets

IMAGE PROCESSING METHOD TO REDUCE COMPRESSION NOISE AND APPARATUS USING THE SAME

CROSS-REFERENCE TO RELATED APPLICATIONS

This application claims priority under 35 U.S.C. §119 from Korean Patent Application No. 10-2009-0062622, filed on Jul. 9, 2009, in the Korean Intellectual Property Office, the disclosure of which is incorporated herein by reference in its entirety.

BACKGROUND OF THE INVENTION

1. Field of the Invention

Apparatuses and methods consistent with the present invention relate to an image processing method for reducing compression noise and an apparatus using the same, and more particularly, to an image processing method for adaptively reducing digital compression noise of an image and an apparatus using the same.

2. Description of the Related Art

Image media providers provide an image in a compressed format such as a motion picture experts group 2 (MPEG-2) to provide a large amount of image data maintaining high quality. A device for reducing noise of compressed digital data adjusts the extent of processing noise of digital data according to the quantization scale Q which is used to measure the degree of compressing decoded image data. The quantization scale Q is calculated as a single value for a single image frame, and if the quantization scale Q is increased, the extent of processing noise may be increased.

However, since a related art device for reducing noise of compressed digital data collectively reduces noise without distinguishing the extent of processing noise between regions having high frequency and low frequency of compression noise occurrence, there is a limitation in optimizing the extent of processing noise.

If the relatively low extent of processing noise is applied to the region in which compression noise frequently occurs, it is insufficient to process the compression noise, and thus a lot of noise occurs, and if the relatively high extent of processing noise is applied to the region in which compression noise infrequently occurs, the compression noise is excessively processed and thus blurring may occur.

Therefore, there is a need for methods to optimize the extent of processing noise.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

Exemplary embodiments provide an image processing method and an image processing apparatus which determines the degree of reducing compression noise according to the weight determined based on the local information and the frame information of an input image so as to optimize the extent of processing noise.

According to an exemplary aspect of the present invention, there is provided an image processing method, including extracting local information and frame information from a decoded image; and determining weight to reduce compression noise of the image based on the local information and the frame information.

The local information may be included in a layer of a macro block, and comprise information regarding the location of a macro block corresponding to the image.

The information included in the layer of the macro block may include at least one of information regarding a quantization scale code and information regarding macro block skipping.

The determining may include setting the weight to be high if the quantization scale code is equal to or more than level 1 and less than level 2, and setting the weight to be low if the quantization scale code is less than level 1 or equal to or more than level 2.

The determining may include setting the weight to be high if the information regarding macro block skipping indicates not to skip the macro block, and setting the weight to be low if the information regarding macro block skipping indicates to skip the macro block.

The frame information may be included in a picture layer, and include information regarding a frame of a picture corresponding to the image.

The information included in the picture layer may include at least one of information regarding an interlaced frame, information regarding the type of an original format, and information regarding an encoded frame.

The determining may include setting the weight to be high if the image is an interlaced image, and setting the weight to be low if the image is a progressive image.

The determining may include setting the weight to be high if the type of an original format of the image is a film image, and setting the weight to be low if the type of an original format of the image is a video image.

The determining may include setting the weight to be high if an encoded frame of the image is an I-frame, and setting the weight to be low if an encoded frame of the image is a P-frame or a B-frame.

The local information may include information regarding a quantization scale code and information regarding macro block skipping, and the frame information comprises information regarding an interlaced frame, information regarding the type of an original format, and information regarding an encoded frame, wherein the determining may include applying the weight having a different level for each information to the image, wherein the level of the weight may be determined in order of the information regarding an interlaced frame, the information regarding the type of an original format, the information regarding an encoded frame, the information regarding a quantization scale code, and the information regarding macro block skipping.

According to an exemplary aspect of the present invention, there is provided an image processing method, including decoding an image; and extracting information included in a header of image data which are formed in a macro block unit in the decoded image and information included in a header of image data which are formed in a picture unit in the decoded image, and determining weight to reduce compression noise of the image based on the extracted information.

According to an exemplary aspect of the present invention, there is provided an image processing apparatus, including a decoding unit which decodes an image; a controlling unit which extracts local information and frame information from the decoded image, and determines weight to reduce compression noise of the image based on the local information and the frame information; and an image processing unit which processes the decoded image based on the weight.

The local information may be included in a layer of a macro block, and include information regarding the location of a macro block corresponding to the image.

The information included in the layer of the macro block may include at least one of information regarding a quantization scale code and information regarding macro block skipping.

The controlling unit may set the weight to be high if the quantization scale code is equal to or more than level 1 and less than level 2, and set the weight to be low if the quantization scale code is less than level 1 or equal to or more than level 2.

The controlling unit may set the weight to be high if the information regarding macro block skipping indicates not to skip the macro block, and set the weight to be low if the information regarding macro block skipping indicates to skip the macro block.

The frame information may be included in a picture layer, and include information regarding a frame of a picture corresponding to the image.

The information included in the picture layer may include at least one of information regarding an interlaced frame, information regarding the type of an original format, and information regarding an encoded frame.

The controlling unit may set the weight to be high if the image is an interlaced image, and set the weight to be low if the image is a progressive image.

The controlling unit may set the weight to be high if the type of an original format of the image is a film image, and set the weight to be low if the type of an original format of the image is a video image.

The controlling unit may set the weight to be high if an encoded frame of the image is an I-frame, and set the weight to be low if an encoded frame of the image is a P-frame or a B-frame.

The local information may include information regarding a quantization scale code and information regarding macro block skipping, and the frame information comprises information regarding an interlaced frame, information regarding the type of an original format, and information regarding an encoded frame, wherein the controlling unit may apply the weight having a different level for each information to the image, wherein the level of the weight may be determined in order of the information regarding an interlaced frame, the information regarding the type of an original format, the information regarding an encoded frame, the information regarding a quantization scale code, and the information regarding macro block skipping.

According to an exemplary aspect of the present invention, there is provided an image processing apparatus, including a decoding unit which decodes an image; a controlling unit which extracts information included in a header of image data which are formed in a macro block unit in the decoded image and information included in a header of image data which are formed in a picture unit in the decoded image, and determines weight to reduce compression noise of the image based on the extracted information; and an image processing unit which processes the decoded image based on the weight.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
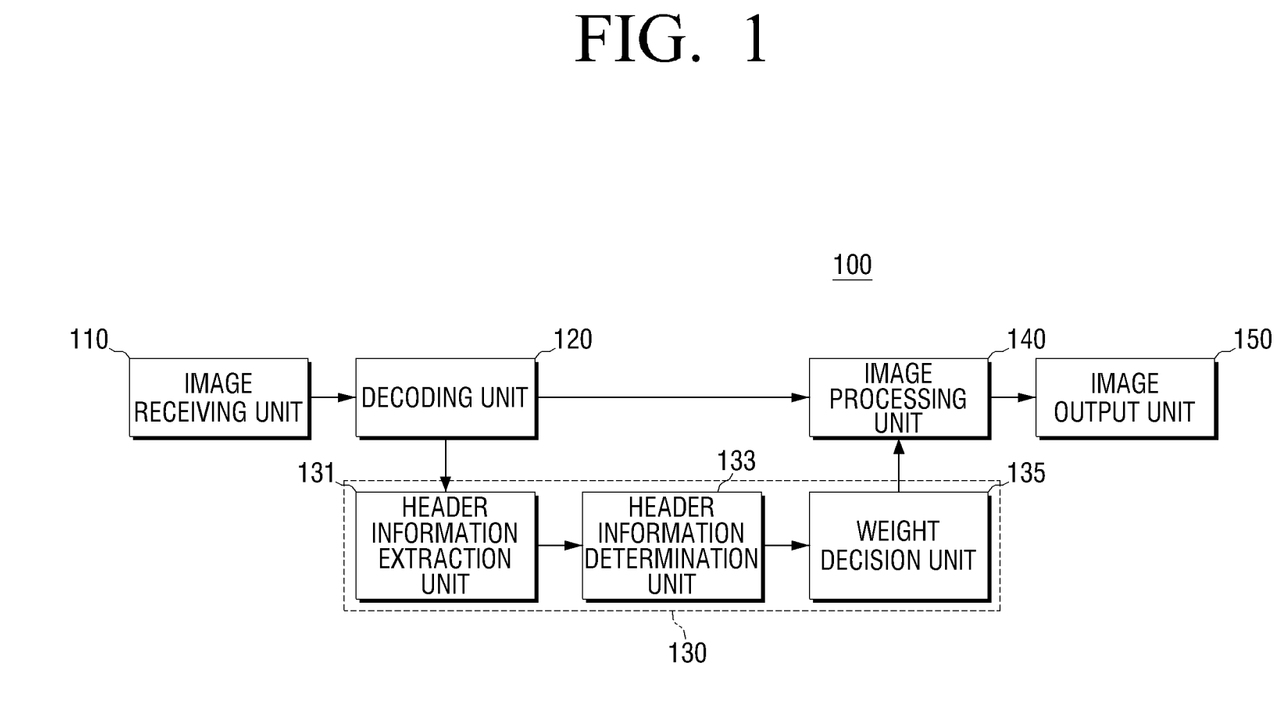
FIG. 1 is a block diagram illustrating an image processing apparatus according to an exemplary embodiment of the present invention.

FIG. 1 is a block diagram illustrating an image processing apparatus 100 according to an exemplary embodiment of the present invention. The image processing apparatus 100 according to the exemplary embodiment of the present invention decodes a digitally compressed image, determines weight to reduce compression noise of the decoded image for a plurality of factors, based on information extracted from the image, and relieves compression noise based on the weight determined for each factor.

Referring to FIG. 1, the image processing apparatus 100 comprises an image receiving unit 110, a decoding unit 120, a controlling unit 130, an image processing unit 140, and an image output unit 150.

The image receiving unit 110 receives image data. Specifically, the image receiving unit 110 received image data which are compressed in a motion picture experts group 2 (MPEG-2) format.

The image receiving unit 110 may receive image data in various formats. Specifically, the image receiving unit 110 may receive image data from a storage medium which stores an image being compressed in an MPEG-2 format. For example, since a digital versatile disc (DVD) generally compresses an image in an MPEG-2 format and stores the compressed image, the image receiving unit 110 may receive a compressed image from the DVD. In addition, the image receiving unit 110 may receive an image over a broadcast signal. According to a digital broadcast standard, an image is compressed and broadcast in an MPEG-2 format. Accordingly, the image receiving unit 110 may receive an image which is compressed in an MPEG-2 format over a digital broadcast signal.

The decoding unit 120 receives an image which is compressed in an MPEG-2 format and decodes the received image, and accordingly outputs the decompressed image. The decoding unit 120 transfers the decompressed image to the controlling unit 130 and the image processing unit 140.

The controlling unit 130 controls overall operations of the image processing apparatus 100. Specifically, the controlling unit 130 extracts header information from the decompressed image data, calculates discrete weight which will be applied to each factor to reduce compression noise based on the extracted header information, and determines a final weight which is calculated by applying the calculated discrete weights to each factor.

To do so, the controlling unit 130 comprises a header information extraction unit 131, a header information determination unit 133, and a weight decision unit 135.

The header information extraction unit 131 extracts header information from decompressed image data. The header information is included in a picture layer and a macro block layer of a decompressed image.

The header information included in a picture layer of a decompressed image includes information regarding a picture corresponding to an image. Accordingly, the header information included in the picture layer may be frame information regarding an image. The header information included in a macro block layer includes information regarding a macro block corresponding to an image. Accordingly, the header information included in the macro block layer may be local information regarding an image.

The header information included in the picture layer includes information regarding an interlaced frame, information regarding the type of an original format, information regarding an encoded frame, and so on, and the header information included in the macro block layer includes information regarding a quantization scale code, information regarding macro block skipping, and so on. This is explained with reference to FIG. 2.

Figure 2:
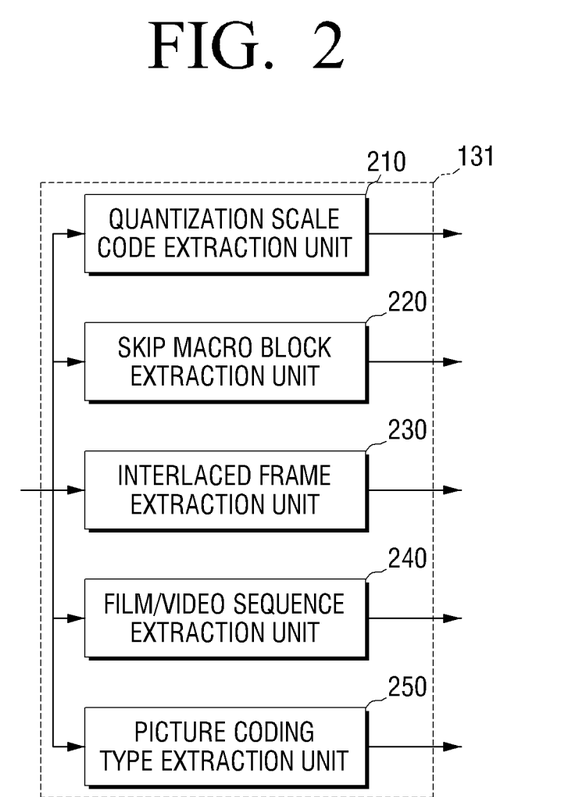
FIG. 2 is a detailed block diagram of a header information extraction unit according to the exemplary embodiment.

FIG. 2 is a detailed block diagram of the header information extraction unit 131. The header information extraction unit 131 comprises a quantization scale code extraction unit 210, a skip macro block extraction unit 220, an interlaced frame extraction unit 230, a film/video sequence extraction unit 240, and a picture coding type extraction unit 250.

The quantization scale code extraction unit 210 extracts information regarding a quantization scale code included in a macro block layer from a decoded image. Specifically, the quantization scale code extraction unit 210 extracts information regarding a quantization scale code which is stored in a Get quantization scale code block among header information included in a macro block layer.

The information regarding a quantization scale code represents the degree of compression of a macro block corresponding to an input image. The quantization scale code ranges from 0 to 31, and the higher the quantization scale code is, the greater the degree of compression of a macro block is. The information regarding a quantization scale code consists of a 5 bit code to represent the quantization scale code ranging from 0 to 31.

The skip macro block extraction unit 220 extracts information regarding macro block skipping which is included in a macro block skip layer from a decoded image. Specifically, the skip macro block extraction unit 220 extracts information regarding macro block skipping which is stored in a Get skip macro block among header information of a macro block layer.

The information regarding macro block skipping represents a complex detail of a macro block corresponding to an input image. If a macro block skip mode of the information regarding macro block skipping is set to be ON, an input image may mainly consist of black data, or contain a lot of details. On the other hand, if a macro block skip mode of the information regarding macro block skipping is set to be OFF, an input image may be a general image. The information regarding macro block skipping consists of a 1-bit to represent whether the macro block skip mode is ON or OFF.

The interlaced frame extraction unit 230 extracts information regarding an interlaced frame included in a picture layer from a decoded image. Specifically, the interlaced frame extraction unit 230 extracts information regarding an interlaced frame which is stored in a Get interlaced frame block among header information of a picture layer.

The information regarding an interlaced frame represents whether a frame corresponding to an input image is interlaced or not. If the information regarding an interlaced frame is set to be True, an input image may be an interlaced image. On the other hand, if the information regarding an interlaced frame is set to be False, an input image may be a progressive image. The information regarding an interlaced frame consists of a 1 bit value to represent whether or not a frame corresponding to an input image is interlaced or progressive.

The film/video sequence extraction unit 240 extracts information regarding the type of an original format included in a picture layer from a decoded image. Specifically, the film/video sequence extraction unit 240 extracts information regarding the type of an original format which is stored in a Get film/video sequence block among header information of a picture layer.

The original format represents a format before an image is compressed. That is, the original format represents a format of image data which are recorded while an input compression image is photographed. The type of an original format may be classified by only determining whether image data are recorded on a film or a video. In more detail, the type of an original format may be classified into one of 60p video, 50p video, 25p film, 60i NTSC video, 24p film, 50i PAL video, 60i NTSC 32 pull-down film, and 50i PAL 22 pull-down film.

The 60p video represents a progressive video image having 60 frames per second. The 50p video represents a progressive video image having 50 frames per second. The 25p film represents a progressive film image having 25 frames per second. The 60i NTSC video represents an interlaced video image having 60 frames per second, and may comply with the National Television System Committee (NTSC) standard which is used in a broadcast television system in North America. The 24p film represents a progressive film image having 24 frames per second. The 50i PAL video represents an interlaced image having 50 frames per second, and may comply with the Phase Alternating Line (PAL) standard which is used in a broadcast television system in Europe. The 60i NTSC 32 pull-down film represents an image which is converted from a film image having 24 frames per second to 60i NTSC video image by performing a 3:2 pull-down operation. The 50i PAL 22 pull-down film represents an image which is converted from a film image having 25 frames per second into a 50i PAL video image by performing a 2:2 pull-down operation.

The information regarding the type of an image format consists of one or more bits according to the standard to classify a format of an input image. Hereinbelow, image formats will be simply introduced for convenience of description.

The picture coding type extraction unit 250 extracts information regarding an encoded frame included in a picture layer from a decoded image. Specifically, the picture coding type extraction unit 250 extracts information regarding an encoded frame which is stored in a Get picture coding type block among header information of a picture layer.

The information regarding an encoded frame indicates whether a frame corresponding to an input image is an I-frame, a P-frame, or a-B frame. I-frames are the least compressible but do not require other video frames to decode. P-frames can use data from previous I-frames to decompress and are more compressible than I-frames. B-frames can use both previous and forward frames for data reference to get the highest amount of data compression.

Accordingly, an input image may be an I-frame image, a P-frame image, or a B-frame image according to the information regarding an encoded frame. The information regarding an encoded frame consists of a 2 bits value to represent whether a frame corresponding to an input image is an I-frame, a P-frame, or a-B frame.

Referring again to FIG. 1, the information regarding a quantization scale code extracted from the quantization scale code extraction unit 210, the information regarding macro block skipping extracted from the skip macro block extraction unit 220, the information regarding an interlaced frame extracted from the interlaced frame extraction unit 230, the information regarding the type of an original format extracted from the film/video sequence extraction unit 240, and the information regarding an encoded frame extracted from the picture coding type extraction unit 250 are transferred to the header information determination unit 133.

The header information determination unit 133 analyzes information regarding each header based on the extracted header information, and calculates discrete weight according to the determined header information. This is explained with reference to FIG. 3.

Figure 3:
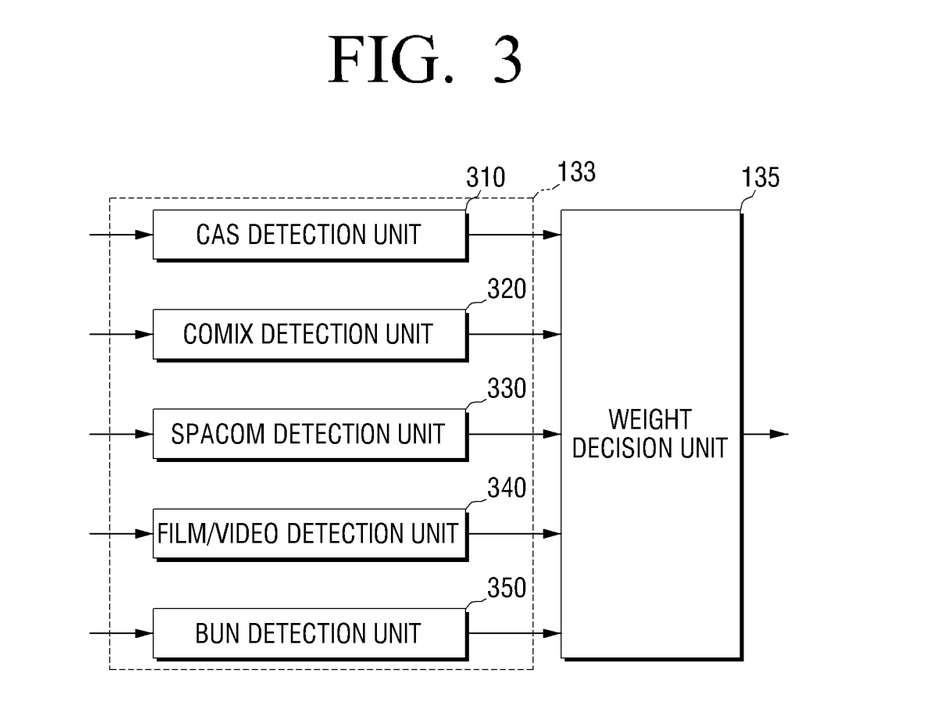
FIG. 3 is a detailed block diagram of a header information determination unit according to the exemplary embodiment.

FIG. 3 is a detailed block diagram of the header information determination unit 133. In FIG. 3, the weight decision unit 135 is illustrated together with the header information determination unit 133 for convenience of description.

The header information determination unit 133 comprises a complex artifact strength (CAS) detection unit 310, a complex detail mixture (COMIX) detection unit 320, a spatial compression (SPACOM) detection unit 330, a film/video detection unit 340, and a bounded/unbounded/none frame (BUN) detection unit 350.

The CAS detection unit 310 detects a quantization scale code of image data based on the information regarding a quantization scale code extracted from the quantization scale code extraction unit 210, and decides the extent of processing noise of the image data based on the detected result. Specifically, if the quantization scale code ranges from 5 to 14, the CAS detection unit 310 sets the extent of processing noise to be high, and if the quantization scale code ranges from 0 to 4 or from 15 to 31, the CAS detection unit 310 sets the extent of processing noise to be low.

The reason for setting the extent of processing noise to be high when the quantization scale code ranges from 5 to 14 and setting the extent of processing noise to be low when the quantization scale code ranges from 0 to 4 or is that the higher the quantization scale code is, the greater an image is compressed, and thus compression noise frequently occurs. However, the reason for setting the extent of processing noise to be low when the quantization scale code ranges from 15 to 31 is that there is no great difference even if the extent of processing noise is set to be high.

The CAS detection unit 310 sets the weight to be high or low according to a factor of a quantization scale code.

The COMIX detection unit 320 detects information regarding macro block skipping of an input image based on the skip macro block information extracted from the skip macro block extraction unit 220, and decides the extent of processing noise based on the detected result. Specifically, if the information regarding macro block skipping indicates "on", the COMIX detection unit 320 sets the extent of processing noise to be low, and if the information regarding macro block skipping indicates "off", the COMIX detection unit 320 sets the extent of processing noise to be high.

The reason for setting the extent of processing noise to be low when the information regarding macro block skipping indicates "on" and setting the extent of processing noise to be high when the information regarding macro block skipping indicates "off" is that the necessity to process noise is trivial since if the information regarding macro block skipping indicates "on", the degree of compressing data is low. The case of indicating the information regarding macro block skipping as "on" represents that an image is a general image, and the case of indicating the information regarding macro block skipping as "off" that an image contains black data or a lot of details.

The COMIX detection unit 320 sets the weight to be high or low according to a factor of macro block skip.

The SPACOM detection unit 330 detects information regarding an interlaced frame extracted from the interlaced frame extraction unit 230, and decides the extent of processing noise of an input image based on the detected result. In more detail, if the information regarding an interlaced frame proves "True", the SPACOM detection unit 330 sets the extent of processing noise to be high, and if the information regarding an interlaced frame proves "False", the SPACOM detection unit 330 sets the extent of processing noise to be low.

The reason for setting the extent of processing noise to be high when the information regarding an interlaced frame proves "True" and setting the extent of processing noise to be low when the information regarding an interlaced frame proves "False" is as follows.

A compressed image complying with an MPEG-2 format, which is produced for broadcasting and a digital versatile disc (DVD), is mainly produced in an interlaced standard. After an interlaced image is converted from a frame structure to a field structure, the interlaced image is compressed in an MPEG-2 format as occasion demands. Herein, compression noise may frequently occur in the compressed image since there is a high possibility that the interlaced image is determined as a complex image. The compression noise occurring in the image may be blocky noise which occurs while discrete cosine transform (DCT) is applied to an image and then DCT quantization is performed on the image, and mosquito noise and ringing noise which occur when a flat area is affected by an edge area of a macro block which is the minimum unit for DCT.

Compression noise occurs less on a progressive image than on an interlaced image, because an MPEG-2 encoder may determine the progressive image as less complex than the interlaced image, and thus compression noise may occur less frequently.

The extent of processing noise is set to be low if the type of an original format is a progressive image, and the extent of processing noise is set to be high if the type of an original format is an interlaced image on which relatively frequent noise occurs.

The SAPCOM detection unit 330 sets the weight to be high or low according to a factor of an interlaced frame.

The film/video detection unit 340 detects information regarding the type of an original format from the film/video sequence extraction unit 240, and decides the extent of processing noise based on the detected result. In more detail, the film/video detection unit 340 sets the extent of processing noise to be high if the type of an original format is film, and the film/video detection unit 340 sets the extent of processing noise to be low if the type of an original format is video.

The reason for setting the extent of processing noise to be high when the type of an original format is film and setting the extent of processing noise to be low when the type of an original format is a video is as follows.

The level of detail of an image varies according to whether an original image is photographed for a film or a video disc. That is, in many cases the film image and the video image are recorded by recording devices having different standards. For example, the recording device for a film image has a low mid frequency of a spatial frequency, whereas the recording device for a video image has a relatively high frequency of a spatial frequency. As the image produced on a film shows a low detail of a mid frequency, the possibility that artifact occurs is relatively low although the extent of processing noise of compressed digital data is increased. On the other hand, as an image produced on a video disc contains a lot of details, the possibility that artifact occurs is relatively high if the extent of processing noise of compressed digital data is increased.

Accordingly, the extent of processing noise is set to be low for an image of which an original format is a video image, and the extent of processing noise is set to be high for an image of which an original format is a film image.

The film/video detection unit 340 sets the weight to be high or low according to a factor of an original format of an image.

The BUN detection unit 350 detects information regarding an encoded frame extracted from the picture coding type extraction unit 250, and decides the extent of processing noise based on the detected result. In more detail, if an encoded frame is an I-frame, the BUN detection unit 350 sets the extent of processing noise to be high, and if an encoded frame is a P-frame or a B-frame, the BUN detection unit 350 sets the extent of processing noise to be low.

The reason for setting the extent of processing noise to be high when an encoded frame is an I-frame and setting the extent of processing noise to be low when an encoded frame is a P-frame or a B-frame is that when an encoded frame is an I-frame, the compression ratio is higher than those of a P-frame and a B-frame since the I-frame is compressed by itself.

The BUN detection unit 350 sets the weight to be high or low according to a factor of an encoded frame.

Referring again to FIG. 1, if discrete weights are calculated according to each header information which is analyzed by the header information determination unit 133, the calculated discrete weights are transferred to the weight decision unit 135.

The weight decision unit 135 determines the final weight by combining the calculated discrete weights. The final weight may be determined by averaging weights for each factor. For example, if the discrete weight is calculated to be low by the CAS detection unit 310, the SPACOM detection unit 330, and the film/video detection unit 340, and the discrete weight is calculated to be high by the COMIX detection unit 320 and the BUN detection unit 350, the weight decision unit 135 may determine the final weight to be 2, ⅖, or 40%.

Alternatively, the final weight may be determined by adding additional weight to the weight for each factor. For example, if the importance is acknowledged in order of the encoded frame, the interlaced frame, the type of an original format, the quantization scale code, and the macro block skip when the extent of processing noise is determined, additional weight of 5 may be applied to the encoded frame, additional weight of 4 may be applied to the interlaced frame, additional weight of 3 may be applied to the type of an original format, additional weight of 2 may be applied to the quantization scale code, and additional weight of 1 may be applied to the macro block skip. In this situation, if the discrete weight is calculated to be low by the CAS detection unit 310, the SPACOM detection unit 330, and the film/video detection unit 340, and the discrete weight is calculated to be high by the COMIX detection unit 320 and the BUN detection unit 350, the weight decision unit 135 may determine the final weight to be 6, ⁶⁄₁₅, or 40%.

The final weight of ⁶⁄₁₅ is calculated as follows:

$$\text{Final weight} = \frac{A*5 + B*4 + C*3 + D*2 + E*1}{5+4+3+2+1} \quad \text{Numerical Formula 1}$$

wherein,

A represents a discrete weight of a factor having the highest additional weight, B represents a discrete weight of a factor having the second highest additional weight, C represents a discrete weight of a factor having the third highest additional weight, D represents a discrete weight of a factor having the fourth highest additional weight, and E represents a discrete weight of a factor having the lowest additional weight.

The weight decision unit 135 transfers the final weight which is determined by combining the calculated discrete weights to the image processing unit 140.

The image processing unit 140 processes image data input from the decoding unit 120 in a manner of scaling and noise reduction. Specifically, the image processing unit 140 processes the input image data to reduce noise according to the weight input from the controlling unit 130. The image processing unit 140 transfers the processed image to the image output unit 150.

The image output unit 150 outputs the processed image on a display screen in the image processing apparatus 100. In addition, the image output unit 150 may also output the processed image to an external display apparatus.

By doing so, noise may be reduced adaptively according to an image and the optimal extent for the image.

The image processing method to reduce compression noise of an image will be explained with reference to FIGS. 4 to 8. FIGS. 4 to 8 illustrate each of image processing methods using information regarding a quantization scale code, information regarding macro block skipping, information regarding an interlaced frame, information regarding the type of an original format, and information regarding an encoded frame.

Figure 4:
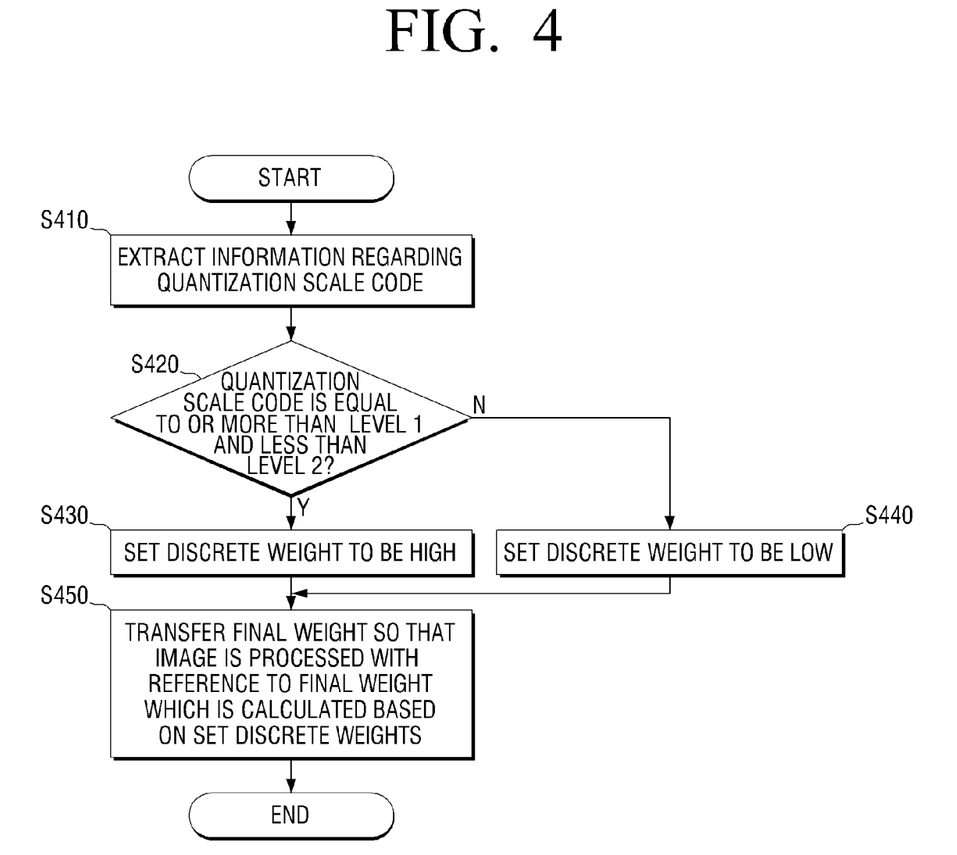
FIG. 4 is a flowchart provided to explain an image processing method using information regarding a quantization scale code according to the exemplary embodiment.

Referring to FIG. 4, the quantization scale code extraction unit 210 extracts information regarding a quantization scale code (S410). The extracted information regarding a quantization scale code is transferred to the CAS detection unit 310, and the CAS detection unit 310 sets the discrete weight using the information regarding a quantization scale code.

Specifically, if the quantization scale code is equal to or more than level 1 and less than level 2 (S420-Y), the CAS detection unit 310 sets the discrete weight for a factor of the quantization scale code to be high (S430), and if the quantization scale code is less than level 1 or equal to or more than level 2 (S420-N), the CAS detection unit 310 sets the discrete weight for a factor of the quantization scale code to be low (S440).

The CAS detection unit 310 transfers the set discrete weight to the weight decision unit 135, and the weight decision unit 135 transfers the final weight to the image processing unit 140 so that an image is processed with reference to the final weight which is calculated based on the set discrete weights (S450).

The discrete weight is set to be low or high according to the reference of level 1 and level 2 in the exemplary embodiment of the present invention, but this is merely exemplary. Accordingly, when the discrete weight is set according to a single reference or a plurality of references, the technical concepts of the present invention may also be applied.

Figure 5:
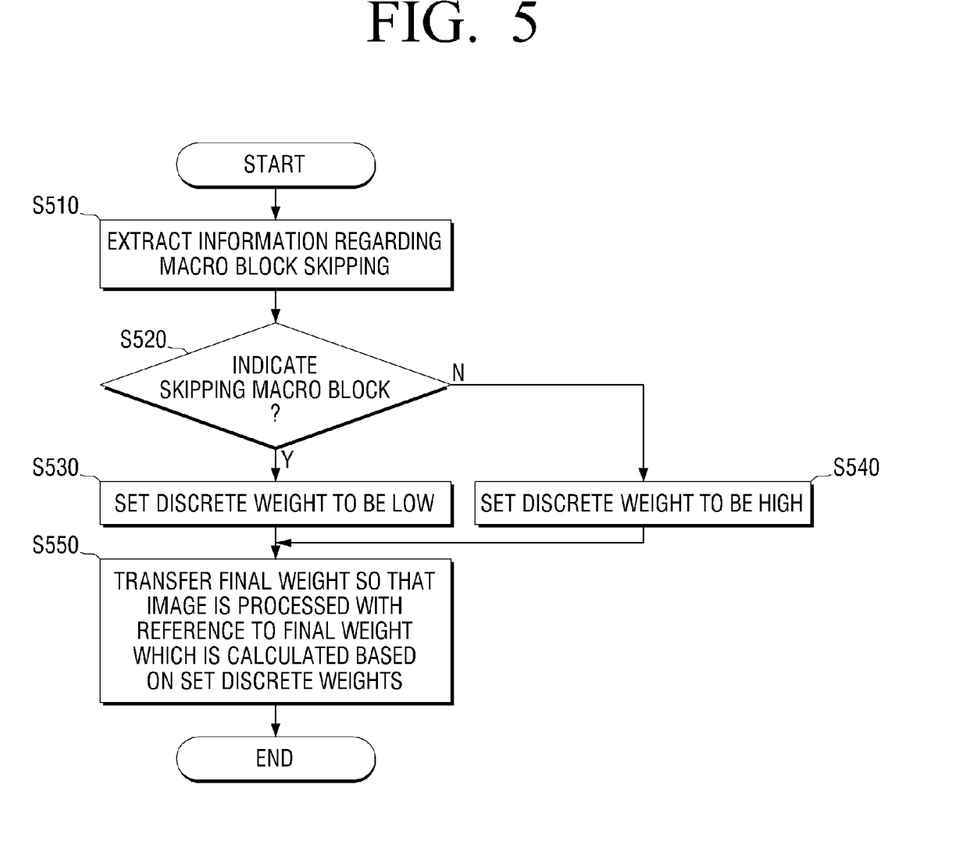
FIG. 5 is a flowchart provided to explain an image processing method using information regarding macro block skipping according to the exemplary embodiment.

Referring to FIG. 5, the skip macro block extraction unit 220 extracts information regarding macro block skipping (S510). The extracted information regarding macro block skipping is transferred to the COMIX detection unit 320, and the COMIX detection unit 320 sets the discrete weight using the information regarding macro block skipping.

Specifically, if the information regarding macro block skipping indicates skipping a macro block (S520-Y), the COMIX detection unit 320 sets the discrete weight for a factor of the macro block skip to be low (S530), and if the information regarding macro block skipping indicates not to skip a macro block (S520-N), the COMIX detection unit 320 sets the discrete weight for a factor of the macro block skip to be high (S540).

The COMIX detection unit 320 transfers the set discrete weight to the weight decision unit 135, and the weight decision unit 135 transfers the final weight to the image processing unit 140 so that an image is processed with reference to the final weight which is calculated based on the set discrete weights (S550).

Figure 6:
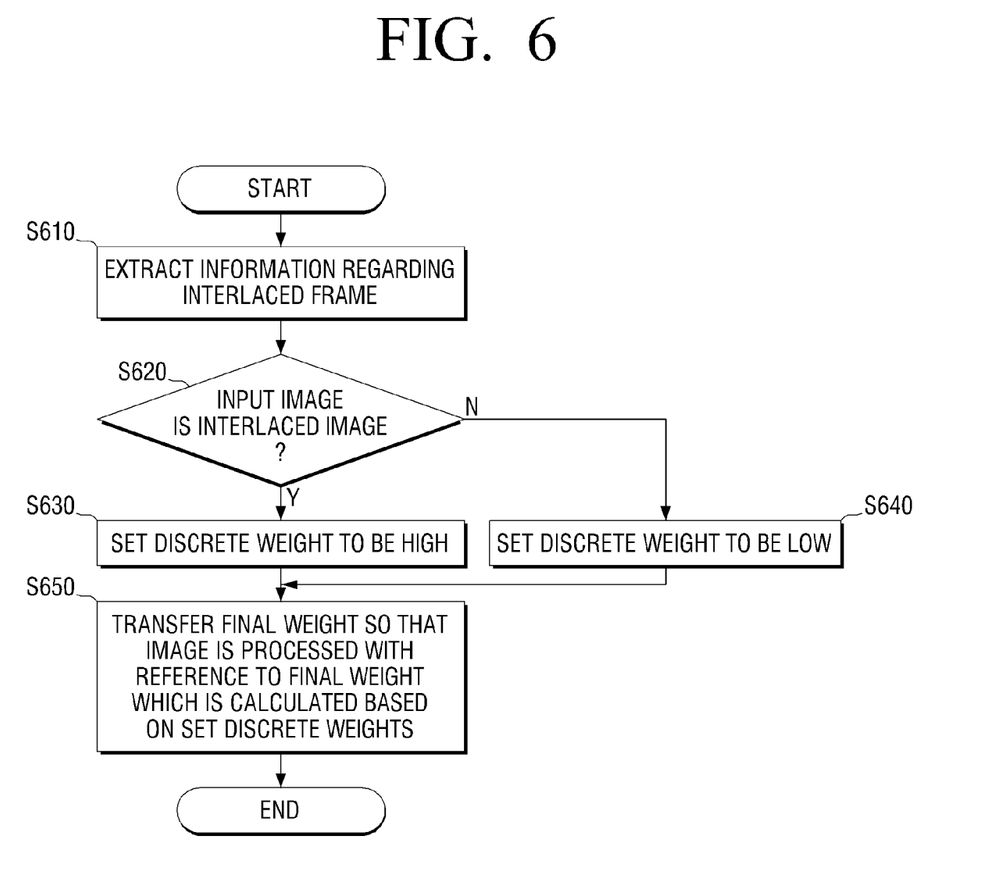
FIG. 6 is a flowchart provided to explain an image processing method using information regarding an interlaced frame according to the exemplary embodiment.

Referring to FIG. 6, the interlaced frame extraction unit 230 extracts the information regarding an interlaced frame (S610). The extracted information regarding an interlaced frame is transferred to the SPACOM detection unit 330, and the SPACOM detection unit 330 sets the discrete weight using the information regarding an interlaced frame.

Specifically, if the information regarding an interlaced frame indicates that an input image is an interlaced image (S620-Y), the SPACOM detection unit 330 sets the discrete weight for a factor of the interlaced frame to be high (S630), and if the information regarding an interlaced frame indicates that an input image is a progressive image (S620-N), the SPACOM detection unit 330 sets the discrete weight for a factor of the interlaced frame to be low (S640).

The SPACOM detection unit 330 transfers the set discrete weight to the weight decision unit 135, and the weight decision unit 135 transfers the final weight to the image processing unit 140 so that an image is processed with reference to the final weight which is calculated based on the set discrete weights (S650).

Figure 7:
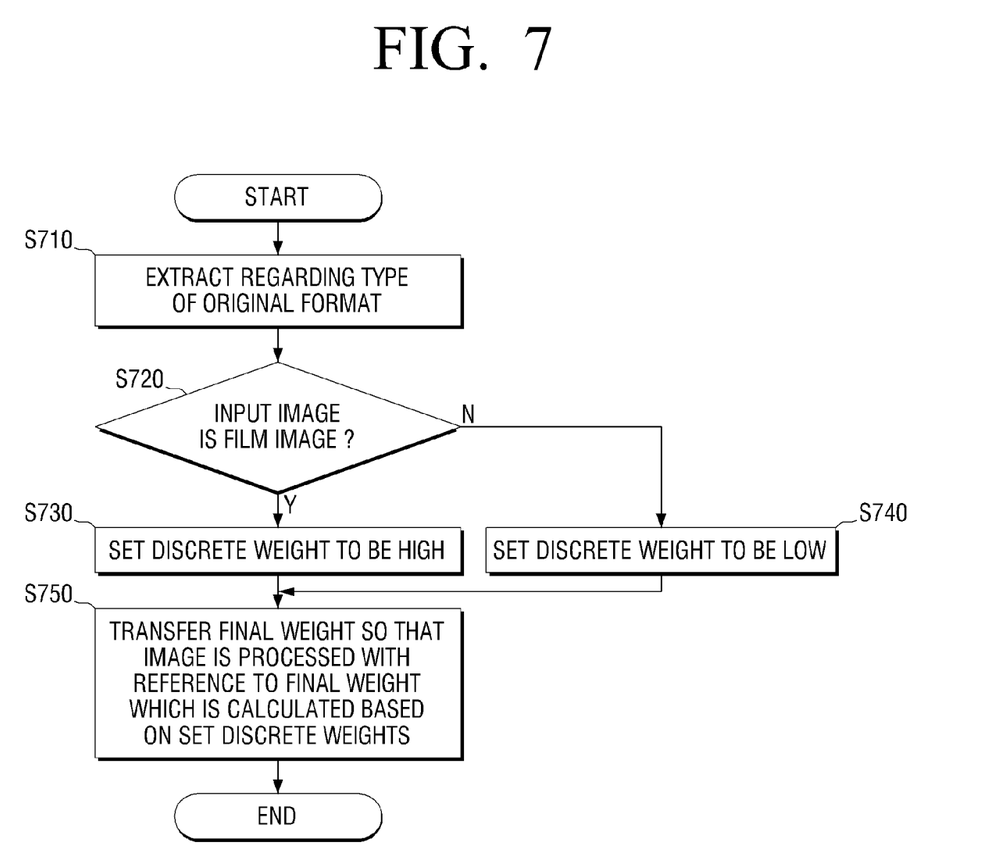
FIG. 7 is a flowchart provided to explain an image processing method using information regarding the type of an original format according to the exemplary embodiment.

Referring to FIG. 7, the film/video sequence extraction unit 240 extracts information regarding the type of an original format (S710). The information regarding the type of an original format is transferred to the film/video detection unit 340, and the film/video detection unit 340 sets the discrete weight using the information regarding the type of an original format.

Specifically, if the information regarding the type of an original format indicates that an input image is a film image (S720-Y), the film/video detection unit 340 sets the discrete weight for a factor of the type of an original format to be high (S730), and if the information regarding the type of an original format indicates that an input image is a video image (S720-N), the film/video detection unit 340 sets the discrete weight for a factor of the type of an original format to be low (S740).

The film/video detection unit 340 transfers the set discrete weight to the weight decision unit 135, and the weight decision unit 135 transfers the final weight to the image processing unit 140 so that an image is processed with reference to the final weight which is calculated based on the set discrete weights (S750).

The type of an original format is schematically classified, and then the weight is applied to an input image in the exemplary embodiment of the present invention, but the technical concept of the present invention may be applied when the type of an original format is classified in detail, and then the weight is applied to an input image. For example, the weight may be applied depending on whether the type of an original format is an NTSC image or a PAL image.

North America uses the NTSC of a digital broadcast standard, and the advanced television systems committee (ATSC) supports transmitting a high definition (HD) image. Europe uses the PAL of a digital broadcast standard, and the PAL supports transmitting a standard definition (SD) image. Accordingly, North America broadcasts both HD and SD images, and Europe mainly broadcasts SD images.

As an HD image contains a lot of details, there is a high possibility that artifact occurs on an image when the operation of reducing compression noise is performed on digital data. On the other hand, as an SD image contains less details, there is a low possibility that artifact occurs on an image although the extent of processing noise is heightened.

Accordingly, the extent of processing noise is set to be low for an image of which an original format is an NTSC image, and the extent of processing noise is set to be high for an image of which an original format is a PAL image.

Figure 8:
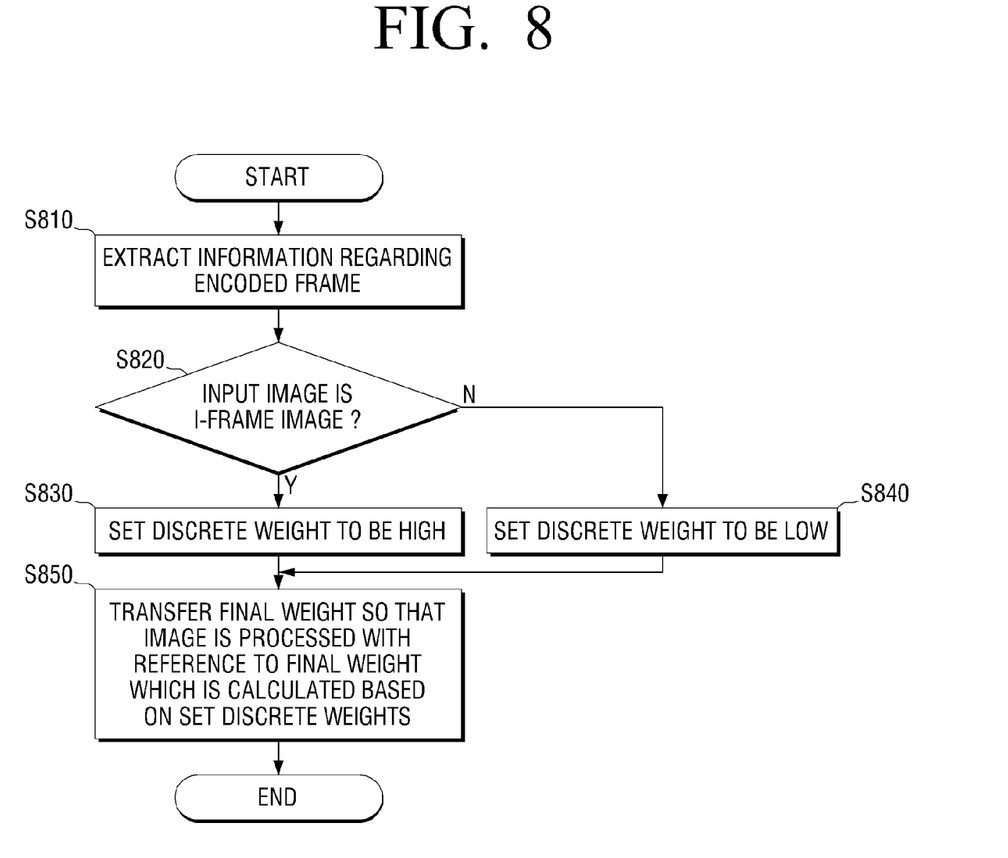
FIG. 8 is a flowchart provided to explain an image processing method using information regarding an encoded frame according to the exemplary embodiment.

Referring to FIG. 8, the picture coding type extraction unit 250 extracts information regarding an encoded frame (S810). The extracted information regarding an encoded frame is transferred to the BUN detection unit 350, and the BUN detection unit 350 sets the discrete weight using the information regarding an encoded frame.

Specifically, if the information regarding an encoded frame indicates that an input image is an I-frame image (S820-Y), the BUN detection unit 350 sets the discrete weight for a factor of the encoded frame to be high (S830), and if the information regarding an encoded frame indicates that an input image is a P-frame image or a B-frame image (S820-N), the BUN detection unit 350 sets the discrete weight for a factor of the encoded frame to be low (S840).

The BUN detection unit 350 transfers the set discrete weight to the weight decision unit 135, and the weight decision unit 135 transfers the final weight to the image processing unit 140 so that an image is processed with reference to the final weight which is calculated based on the set discrete weights (S850).

The image processing unit 140 performs signal processing to reduce noise of an image which is input by reflecting the final weight determined based on each discrete weight as shown in FIGS. 4 to 8.

Accordingly, noise is adaptively reduced according to an image, and the thus noise is alleviated by applying the optimum extent to the image.

The final weight is determined using the factor of the quantization scale code, the factor of the macro block, the factor of the interlaced frame, the factor of the original format, and the factor of the encoded frame in the exemplary embodiment of the present invention, but this is merely exemplary. Accordingly, the decision of the final weight is not limited to using the above factors, and other factors besides the above factors may also be used to determine the final weight.

The plurality of factors are used to adjust the extent of processing noise in the exemplary embodiment of the present invention, but the plurality of factors may also be applied to other operations of processing an image.

According to various exemplary embodiments of the present invention, an image processing method which determines the weight for reducing compression noise and an image processing apparatus are provided in order to ideally reduce compression noise of an image, and thus compression noise reduction is adaptively performed according to an input image.

As the weight is determined to reduce compression noise of an input image according to local information and frame information of the input image, the noise is adaptively reduced according to the input image, and also the noise reduction is performed with the optimal extent.

The present invention can be embodied as a computer program on a computer readable recording medium and/or other transmission media. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Other transmission media can include media such as carrier waves (e.g., transmission through the Internet).

The computer system and/or hardware units adapted to execute the present invention may include a processor, and a memory under control of the processor including a computer program, or otherwise executable commands, enabling the computer system and/or hardware units to perform the present invention.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image processing method, comprising:
    extracting local information and frame information from an image; and
    determining a level of noise processing to reduce compression noise of the image based on the extracted information,
    wherein the local information comprises information regarding a quantization scale code and information regarding macro block skipping, and the frame information comprises information regarding an interlaced frame, information regarding the type of an original format, and information regarding an encoded frame,
    wherein the determining comprises determining a final weight by adding additional weight to the weight of each of the information regarding an interlaced frame, the information regarding the type of an original format, and the information regarding an encoded frame, the information regarding a quantization scale code, and the information regarding macroblock skipping.

2. The image processing method as claimed in claim 1, wherein the local information is included in a layer of a macro block, and comprises information regarding the location of a macro block corresponding to the image.

3. The image processing method as claimed in claim 1, wherein the determining comprises:

setting the level of noise processing to be high if the local information comprises information regarding a quantization scale code and the quantization scale code is equal to or more than a first level and less than a second level, and setting the level of noise processing to be low if the local information comprises information regarding a quantization scale code and the quantization scale code is less than the first level or equal to or more than the second level.

4. The image processing method as claimed in claim 1, wherein the determining comprises:
    setting the level of noise processing to be high if the local information comprises information regarding macroblock skipping and the information regarding macro block skipping indicates not to skip the macro block, and setting the level of noise processing to be low if the local information comprises information regarding macroblock skipping and the information regarding macroblock skipping indicates to skip the macro block.

5. The image processing method as claimed in claim 1, wherein the frame information is included in a picture layer, and comprises information regarding a frame of a picture corresponding to the image.

6. The image processing method as claimed in claim 1, wherein the determining comprises:
    setting the level of noise processing to be high if the frame information comprises information regarding an interlaced frame and the image is an interlaced image, and setting the level of noise processing to be low if the frame information comprises information regarding an interlaced frame and the image is a progressive image.

7. The image processing method as claimed in claim 1, wherein the determining comprises:
    setting the level of noise processing to be high if the frame information comprises information regarding the type of an original format and the type of an original format of the image is a film image, and setting the level of noise processing to be low if the frame information comprises information regarding the type of an original format and the type of an original format of the image is a video image.

8. The image processing method as claimed in claim 1, wherein the determining comprises:
    setting the level of noise processing to be high if the frame information comprises information regarding an encoded frame and an encoded frame of the image is an I-frame, and setting the level of noise processing to be low if the frame information comprises information regarding an encoded frame and an encoded frame of the image is a P-frame or a B-frame.

9. The image processing method as claimed in claim 1, wherein the determining comprises assigning a weight level for each element of information to the image, and determining the level of noise processing according to the weight levels assigned to the elements.

10. The image processing method as claimed in claim 9, wherein the weight levels are assigned in the following order of descending weight: the information regarding an interlaced frame, the information regarding the type of an original format, the information regarding an encoded frame, the information regarding a quantization scale code, and the information regarding macro block skipping.

11. An image processing method, comprising:
    decoding an image; and
    extracting information included in a header of image data of a macroblock unit in the decoded image and information included in a header of image data of a picture unit in the decoded image, and determining a level of noise processing to reduce compression noise of the image based on the extracted information, wherein the local information comprises information regarding a quantization scale code and information regarding macro block skipping, and the frame information comprises information regarding an interlaced frame, information regarding the type of an original format, and information regarding an encoded frame, wherein the determining comprises determining a final weight by adding additional weight to the weight of each of the information regarding an interlaced frame, the information regarding the type of an original format, and the information regarding an encoded frame, the information regarding a quantization scale code, and the information regarding macroblock skipping.

12. An image processing apparatus, comprising:

a decoding unit which decodes an image;

a controlling unit which extracts local information and frame information from the decoded image, and determines a level of noise processing to reduce compression noise of the image based on the extracted information; and an image processing unit which processes the decoded image based on the level of noise processing, wherein the local information comprises information regarding a quantization scale code and information regarding macro block skipping, and the frame information comprises information regarding an interlaced frame, information regarding the type of an original format, and information regarding an encoded frame, wherein the determining comprises determining a final weight by adding additional weight to the weight of each of the information regarding an interlaced frame, the information regarding, the type of an original format, and the information regarding an encoded frame, the information regarding a quantization scale code, and the information regarding macroblock skipping.

13. The image processing apparatus as claimed in claim 12, wherein the local information is included in a layer of a macro block, and comprises information regarding the location of a macro block corresponding to the decoded image.

14. The image processing apparatus as claimed in claim 13, wherein the controlling unit sets the level of noise processing to be high if the local information comprises information regarding a quantization scale code and the quantization scale code is equal to or more than a first level and less than a second level, and sets the level of noise processing to be low if the local information comprises information regarding a quantization scale code and the quantization scale code is less than the first level or equal to or more than the second level.

15. The image processing apparatus as claimed in claim 13, wherein the controlling unit sets the level of noise processing to be high if the local information comprises information regarding macroblock skipping and the information regarding macro block skipping indicates not to skip the macro block, and sets the level of noise processing to be low if the local information comprises information regarding macroblock skipping and the information regarding macroblock skipping indicates to skip the macro block.

16. The image processing apparatus as claimed in claim 12, wherein the frame information is included in a picture layer, and comprises information regarding a frame of a picture corresponding to the image.

17. The image processing apparatus as claimed in claim 16, wherein the controlling unit sets the level of noise processing to be high if the frame information comprises information regarding an interlaced frame and the image is an interlaced image, and sets the level of noise processing to be low if the frame information comprises information regarding an interlaced frame and the image is a progressive image.

18. The image processing apparatus as claimed in claim 16, wherein the controlling unit sets the level of noise processing to be high if the frame information comprises information regarding the type of an original format and the type of an original format of the image is a film image, and sets the level of noise processing to be low if the frame information comprises information regarding the type of an original format and the type of an original format of the image is a video image.

19. The image processing apparatus as claimed in claim 16, wherein the controlling unit sets the level of noise processing to be high if the frame information comprises information regarding an encoded frame and an encoded frame of the image is an I-frame, and sets the level of noise processing to be low if the frame information comprises information regarding an encoded frame and an encoded frame of the image is a P-frame or a B-frame.

20. The image processing apparatus as claimed in claim 12, wherein the controlling unit assigns a weight level for each element of information to the image, and determines the level of noise processing according to the weight levels assigned to the elements.

21. The image processing apparatus as claimed in claim 20, wherein the weight levels are assigned in the following order of descending weight: the information regarding an interlaced frame, the information regarding the type of an original format, the information regarding an encoded frame, the information regarding a quantization scale code, and the information regarding macro block skipping.

22. An image processing apparatus, comprising:

a decoding unit which decodes an image;

a controlling unit which extracts information included in a header of image data which are formed in a macro block unit in the decoded image and information included in a header of image data which are formed in a picture unit in the decoded image, and determines a level of noise processing to reduce compression noise of the image based on the extracted information; and an image processing unit which processes the decoded image based on the level of noise processing, wherein the local information comprises information regarding a quantization scale code and information regarding macro block skipping, and the frame information comprises information regarding an interlaced frame, information regarding the type of an original format, and information regarding an encoded frame, wherein the determining comprises determining a final weight by adding additional weight to the weight of each of the information regarding an interlaced frame, the information regarding the type of an original format, and the information regarding an encoded frame, the information regarding a quantization scale code, and the information regarding macroblock skipping.

* * * * *